Feb. 2, 1926. 1,571,618
S. J. BELL
CHANGE MAKING MACHINE
Filed Oct. 4, 1921 6 Sheets-Sheet 1

FIG. 1.

Samuel J. Bell, INVENTOR.

BY Frank A. Cutter, ATTORNEY.

Feb. 2, 1926.  1,571,618
S. J. BELL
CHANGE MAKING MACHINE
Filed Oct. 4, 1921    6 Sheets-Sheet 2

Samuel J. Bell, INVENTOR.

BY Frank A. Cutter, ATTORNEY.

Feb. 2, 1926. 1,571,618
S. J. BELL
CHANGE MAKING MACHINE
Filed Oct. 4, 1921  6 Sheets-Sheet 3

Samuel J. Bell, INVENTOR.
BY Frank A. Cutter, ATTORNEY.

Feb. 2, 1926.

S. J. BELL 1,571,618

CHANGE MAKING MACHINE

Filed Oct. 4, 1921    6 Sheets-Sheet 4

Samuel J. Bell, INVENTOR.

BY Frank A. Cutter, ATTORNEY.

Feb. 2, 1926.

S. J. BELL 1,571,618

CHANGE MAKING MACHINE

Filed Oct. 4, 1921     6 Sheets-Sheet 6

Samuel J. Bell, INVENTOR.

BY

Frank A. Cutter, ATTORNEY.

Patented Feb. 2, 1926.

1,571,618

UNITED STATES PATENT OFFICE.

SAMUEL J. BELL, OF SPRINGFIELD, MASSACHUSETTS, ASSIGNOR TO BELL REGISTER, INC., OF WOONSOCKET, RHODE ISLAND, A CORPORATION OF NEW YORK.

CHANGE-MAKING MACHINE.

Application filed October 4, 1921. Serial No. 505,433.

*To all whom it may concern:*

Be it known that I, SAMUEL J. BELL, a citizen of the United States of America, and a resident of Springfield, in the county of Hampden and State of Massachusetts, have invented a new and useful Change-Making Machine, of which the following is a specification.

My invention relates to improvements in machines adapted for use on moving vehicles, at amusement parks and the like, in stores, etc., for making change, and consists in general of a suitable casing containing specially constructed, self-locking receptacles for fares and tokens, a fare-receiving box in communication with one of said receptacles, said fare-receiving box being mounted on said casing, coin and token magazines also mounted on said casing, certain peculiar mechanism within said casing, but adapted to be operated from the outside thereof, for delivering the coins and tokens from said magazines to the hand of the operator and to one of said receptacles, respectively, a register for the tokens, audible indicating means, both of the latter being subject to said delivery mechanism, and certain additional safety features, together with such other parts and members as may be necessary or desirable in order to render the machine complete and serviceable in every particular, all as hereinafter set forth.

One object of my invention is to effect a large saving in time and labor, both in collecting the fees, charges, or fares from the patrons and in delivering the same at the office.

Another object is to prevent theft by the operator, the patrons, and the clerk or cashier at the office.

Still another object is materially to reduce the number of coins which it is necessary to handle in collecting fares or charges.

A further object is to produce a comparatively simple and inexpensive machine wherewith to attain the abovementioned objects and secure the results required with a machine of this character. My machine comprises comparatively few parts and these of a character which are not liable to clog, get out of order, or become impaired except from the natural wear to which they are subjected.

The use of tokens enables me materially to cut down the amount of money that otherwise would have to be employed and handled, and affords an absolute check on dishonesty.

With this machine the operator practically handles none of the company's money, except that which may be placed in the coin reservoirs by the company and charged to the operator and even this may be supplied by the operator himself.

The machine is particularly well adapted for use on trolley-cars and the like, and is herein described in that connection, but it is equally well adapted for other uses. It is to be understood, therefore, that the description herein in no way limits the machine to moving vehicles. Incidently it may be observed that this machine is capable of becoming an important factor in making the change from the regular to one-man trolley-cars, which is constantly taking place at the present time for obvious reasons.

Other objects and advantages will appear in the course of the following description.

A preferred embodiment of the invention, whereby I attain the objects and secure the advantages of the same, is illustrated in the accompanying drawings, and I will proceed to describe the invention with reference to said drawings, although it is to be understood that the form, construction, arrangement, etc. of the parts in various aspects are not material and may be modified without departing from the spirit of my invention or exceeding the scope of what is claimed.

In the drawings, in which like numerals designate like parts throughout the several views.

The casing of this machine, which is indicated by the numeral 1, is divided by a horizontal member 2 into upper and under compartments or chambers 3 and 4, respectively. A compartment 5 is set off by suitable partitions from the chamber 4, in the left-hand end thereof, and said compartment is provided with a door 6. The compartment 5 is for the use of the operator or conductor, and forms no part of the present invention. A door 7, which has its right-hand edge hinged at 8—8 to the corresponding end wall of the chamber 4, is provided to close the entrance to said chamber in front. The door 7 is provided with a lock 9. The door 7 is shown open in the several views where it appears, and only fragmentary portions of said door are present in several of such views. The casing 1 may be provided on the bottom at the corners with feet 10, if desired, and in the center beneath the bottom with a projecting member 11, by means of which latter said casing is mounted on and attached to a supporting pedestal in a street-car. Said casing may also be provided on the ends with handles 12—12.

Within the chamber 4 are a coin-receiving box 14 and a token-receiving box 15. Also within said chamber is a coin chute 16, and the lower portion 17 of a token chute 18. There is also a coin chute 19 on the front of the casing 1 and opening at the bottom outside of said casing.

Figure 3:
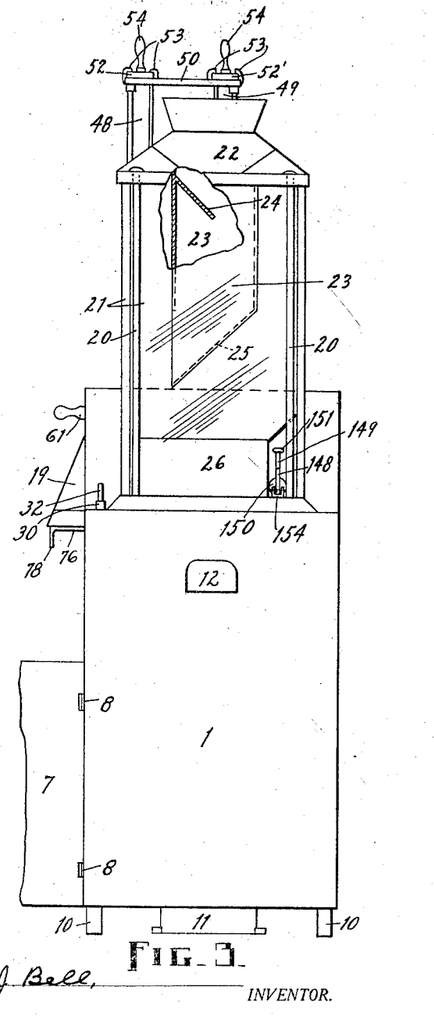
Fig. 3, a right-hand elevation of the same.

The chamber 3 is shorter than the chamber 4, and a fare-box is mounted on top of the larger chamber at the right-hand end of the smaller chamber. This fare-box is not materially different from other fare-boxes, and consists of corner posts or rods 20 erected on the top of the chamber 4, four glass side pieces 21 outside of said posts and fitted into a suitable groove in the top of said chamber, a cap 22 mounted on said posts and side pieces, said cap opening through the top thereof, a coin chute 23 depending from said cap and into which the latter opens, said chute in this case being provided with an upper baffle-plate 24 and an under baffle-plate 25, and opening at the bottom through the front side of the same, a chute 26 below said chute 23, said chute 26 having a wide mouth at the top and being smaller at the bottom to fit and register with an opening 27 in the member 2, and a flapper 28 beneath said opening. Portions of one of the plates 21 and of the chute 23 are broken away in Fig. 3 to expose the baffle-plate 24. The flapper 28 is within the chute 16 and hinged thereto at 29. A spring 30 is arranged to retain the flapper 28 in a horizontal position across the bottom of the opening 27.

Coins or tickets, dropped into the top of the cap 22, pass downwardly through said cap and the chute 23 into the chute 26, where they rest and are prevented from further downward movement by the flapper 28 when closed, and the spring 30 normally retains said flapper in closed position. The baffle-plates 24 and 25 serve the usual purpose of preventing the introduction of instruments from above into the chute 26 for the purpose of removing coins or tickets from the fare-box.

Figure 1:
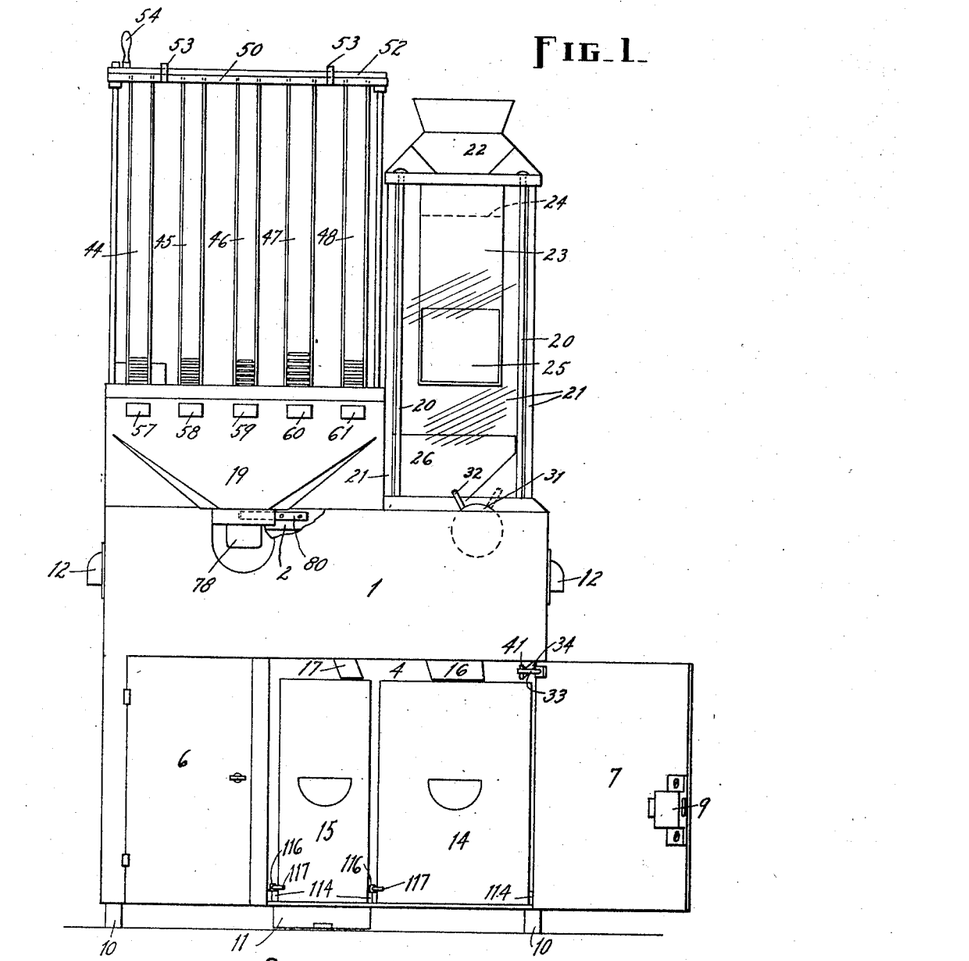
Figure 1 is a front elevation of a change-making machine which embodies a practical form of my invention as aforesaid.
Figure 8:
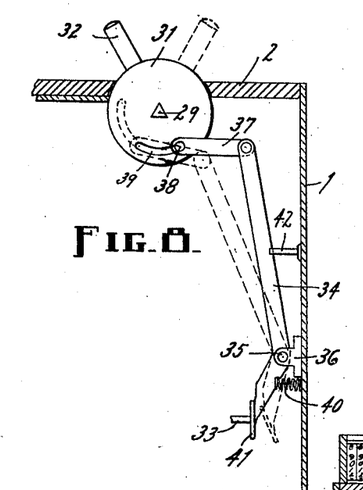
Fig. 8, an enlarged detail in front elevation of the automatic dumping mechanism.

Secured to the forward terminal of the pivot, rod, or shaft 29 is a disc 31 which is provided with a radial pin or handle 32. The handle 32 is located above the top of the compartment 4 and in front of the fare-box, in convenient position to be grasped for the purpose of rocking the shaft 29, through the medium of the disc 31, in the direction to move the flapper 28 from its full-line position to its dotted-line position in Fig. 4, and thus dump the contents of the fare-box into the chute 16. This operation is against the resiliency of the spring 30, consequently when the handle 32 is released said spring acts to restore the parts to their former and normal position and close the opening 27 with the flapper 28. The contents of the chute 16 pass by gravity into the coin box 14, as will presently be more clearly explained, said contents having already passed by gravity into said chute. The handle 32 normally occupies the position indicated by dotted lines in Figs. 1 and 8.

In order to insure the discharge of the contents of the fare-box into the box 14, and thus prevent such contents from being discharged into the hand of the conductor or office man at the end of the day's run, provision is made whereby the flapper 28 is opened each time that the door 7 is opened, and said door must be opened in order to take out the boxes 14 and 15 at the time above-noted or other stated intervals. To this end I provide the door 7 with a horizontal, curved arm 33, on the inside and above the general location of the upper hinge 8, and arrange within the chamber 4 spring-pressed, pivotal means which is engaged by said arm when said door is closed. The aforesaid means comprises an approximately upright, operating lever 34, which is pivotally attached at 35 to a lug 36 on the inside of the adjacent end wall of the casing 1, an approximately horizontal link 37 which has one end pivotally connected with the upper terminal of said lever, and the other end provided with a pin 38 that passes through an arcuate slot 39 in the disc 31, and a spring 40. The lever 34 is somewhat angular in shape and divided as it were by the pivot 35 into a short arm below and a long arm above, and at the bottom of said lever is a bearing piece 41 to receive the free end of the arm 33. The spring 40 is arranged between the short arm of the lever 34 and the adjacent wall of the casing, and so normally retains the long arm of said lever in contact with a stop 42, and the pin 38 at the right-hand end of its travel. The stop 42 extends inwardly from the right-hand end wall of the chamber 4 to which said stop is attached.

Figure 9:
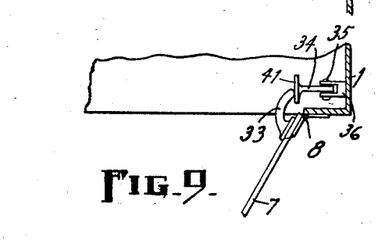
Fig. 9, a top plan of parts of said mechanism.

It will now be seen that, when the door 7 is closed, the arm 33 contacts with the bearing 41, actuates the lever 34, against the resiliency of the spring 40, in the direction to carry the link 37 to the left, and with it the disc 31, which latter is retained with the right-hand end of the slot 39 in contact or engagement with the pin 38 by the action of the spring 30. The parts are now positioned as indicated by dotted lines in Fig. 8, and the disc 31 is free to be operated by hand through the medium of the handle 32 to dump the contents of the fare-box from time to time as may be desired. Upon opening the door 7, however, the arm 33 is carried away from the bearing 41, and the spring 40 acts on the lever 34 in such a manner as to cause the same to actuate the disc 31 in the direction to cause the flapper 28 to assume its open position, said spring being stronger than the spring 30. The parts are now disposed as shown in full lines in Figs. 8 and 9.

The automatic dumping mechanism just described is so proportioned and arranged that the desired operation is brought about as soon as the door 7 commences to open, so that the contents of the fare-box is discharged into the coin box 14 before said door can be opened wide enough to remove said coin box.

Mounted on the top of the chamber 3, which top is indicated by the numeral 43, and let into and opening through the same, are a series of coin reservoirs and a series of token reservoirs, the latter being behind the former. There are five coin reservoirs and they are designated from left to right by the numerals 44, 45, 46, 47, and 48. There are only four token reservoirs and these are designated by the numerals 49. The number of reservoirs will differ according to the different conditions which the machine is designed to meet. The present machine is designed for a seven-cent fare on street railways. The reservoirs are preferably of glass, and they are supported at the top by a horizontal plate 50 through which said reservoirs open. The plate 50 is carried on four corner posts or rods 51 which are erected on the member 43. Slides 52 and 52' are arranged, between two sets of lugs 53 on top of the plate 50, to cover and uncover the upper ends of the coin and token reservoirs, respectively. Each of these slides has a vertical handle 54 for convenience in operating the same. It is not necessary usually to provide a lock for the slide 52, but the slide 52' is provided with a lock, such lock in the present example consisting merely of a pin 55 that passes downwardly through vertical openings in said slide and the plate 50, when said slide is in its closed position, and a padlock 56 engaged with the lower protruding terminal of said pin to prevent the upward removal of the same. The pin 55 has a head to limit its downward movement.

The coins with which the conductor makes change are placed in the front reservoirs, and the tokens for keeping an exact record of the number of fares for which the conductor makes change are placed in the rear reservoirs. The coins in the front reservoirs, if placed there by the company, are charged to the conductor, and as a rule it is necessary for the conductor to supplement these coins or refill the coin reservoirs from time to time during the day or even during a trip. In some cases the conductor's money alone is used in the front reservoirs. The back reservoirs are filled or loaded by the company and the conductor has nothing whatsoever to do with the same. It is for this reason that the slide or cover 52 is locked when in place over the upper ends of all of the reservoirs 49.

In the present arrangement the reservoirs 44, 45, and 48 are designed to contain pennies, the reservoir 46 is designed to contain dimes and pennies which should be alternately arranged therein, and the reservoir 47 to contain nickels and pennies, the same being arranged in groups or units of three nickels and three pennies, although the particular relationship of the nickels and pennies to each other in each group or unit is not material. From the reservoir 48 change is made for a single fare of seven-cents from a dime; from the reservoir 47 change is made for a single fare of the same amount from a quarter of a dollar; from the reservoir 46 change is made for two fares out of a quarter; and from the reservoir 45 change is made for three fares out of a quarter; while from the reservoir 44 five pennies at a time are obtained to be exchanged for a nickel.

Figures 4, 5, 6, 7:
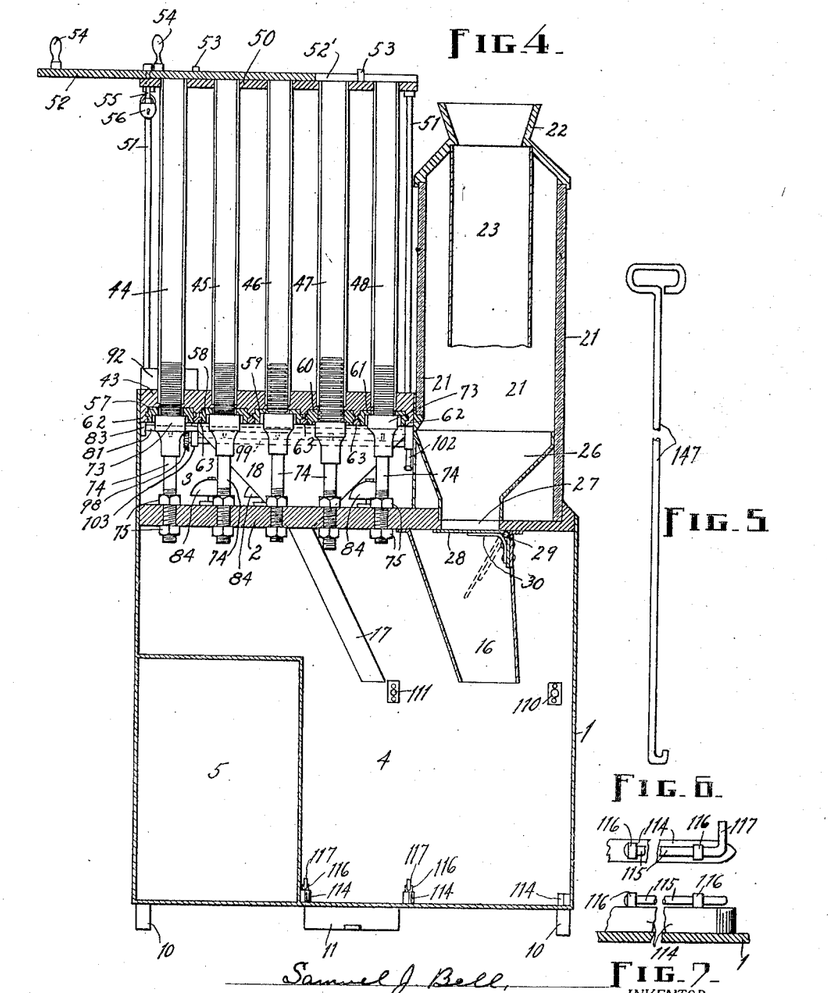
Fig. 4, a longitudinal, vertical section through the machine, looking toward the rear.
Fig. 5, a side elevation of the hook for removing the slugs in the token reservoirs.
Fig. 6, an enlarged detail in top plan of one of the guides and latches for the coin and token boxes.
Fig. 7, a side elevation of the parts shown in the preceding view.
Figure 11:
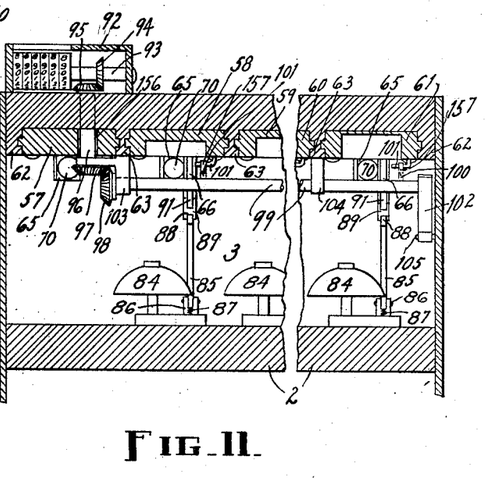
Fig. 11, an enlarged detail of the registering and indicating mechanism.
Figure 12:
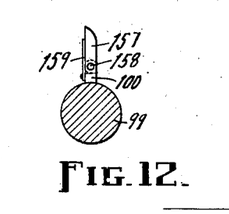
Fig. 12, an enlarged detail of a portion of the counting mechanism.
Figures 13, 14:
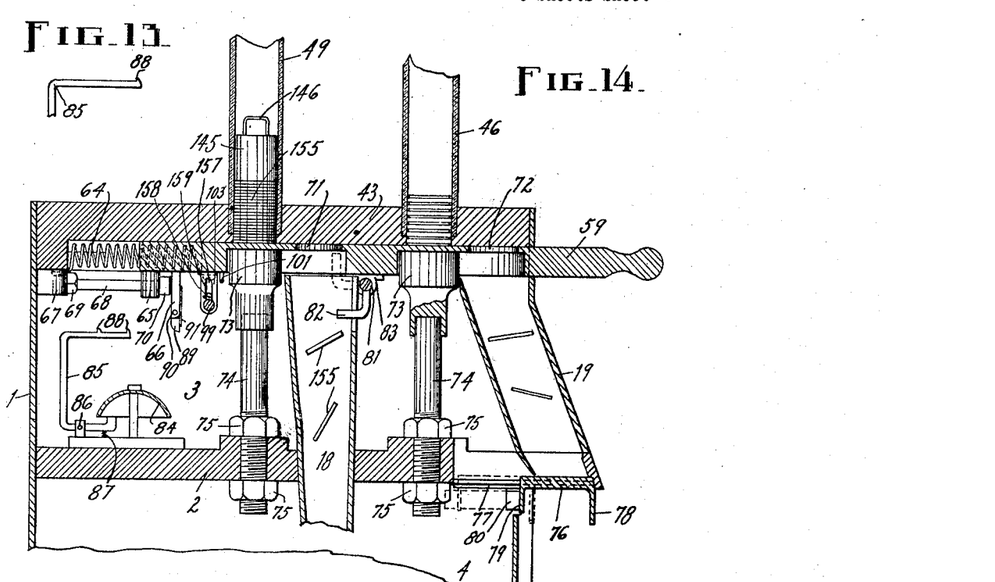
Fig. 13, an enlarged, side elevation of a portion of one of the strikers.
Fig. 14, an enlarged longitudinal section, taken on lines 13—13, looking in the direction of the associated arrow, in Fig. 15.
Figure 15:
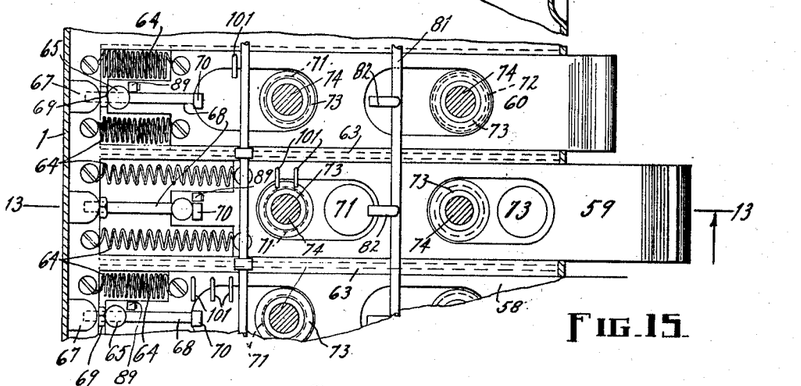
Fig. 15, an enlarged detail in bottom plan of certain of the delivery slides and associated members.

As previously observed, the reservoirs all have their bases set into the top member 43, and said reservoirs open through said member. Slidingly arranged beneath the openings in the member 43 which communicate with the interiors of the reservoirs are five delivery slides of generally similar construction. These slides are designated from left to right by the numerals 57, 58, 59, 60, and 61. The slide 57 is situated beneath the reservoir 44, and the slide 61 beneath the reservoir 48, with the other three slides situated respectively beneath the reservoirs 45, 46, and 47. The delivery slides are rabbeted at their sides into downwardly-projecting, supporting members 62 and 63, the former being at the lateral edges of the member 43, and the latter being intermediate of such edges, as best shown in Figs. 4 and 11. In plan the delivery slides are of the shape substantially shown in Fig. 15, and each of said slides is normally retained in a retracted position by means of a pair of springs 64. The rear ends of the springs 64 are secured to the member 43 near the back edge thereof, and the front ends of said springs are secured to the delivery slides adjacent to their rear terminals, substantially as shown in Figs. 14 and 15. Each delivery slide has in its longitudinal center a rearwardly-extending tongue from which depend a post 65 and a bar 66. Projecting forwardly from lugs 67 on the under side of the member 43, adjacent to the rear edge thereof, is a rod 68 which is in the vertical plane of the longitudinal center of each of the delivery slides. The post 65, with which each delivery slide is provided, receives one of the rods 68 and is adapted to reciprocate thereon. The movement of each slide is limited by means of a nut 69 on the rod 68 and contiguous to the lug 67 which supports said rod, and a head 70 on the forward end of said rod. The springs 64 normally retain the delivery slides with their posts 65 in contact with the nuts 69, and when any slide is drawn forwardly the movement in that direction is limited by the post beneath said slide which comes into contact with the head 70 of the rod 68 upon which said post moves. The bars 66 are positioned forward of the posts 65, but a sufficient distance on one side of the longitudinal, vertical planes of the slides to enable said bars to clear the heads 70 when said slides are reciprocated.

Each delivery slide has therein a rear opening 71 and a forward opening 72, which openings are in exact alignment with the token and coin reservoirs above when the slide is in its rearmost position. The thickness of the edge of each opening 71 is approximately equal to the thickness of a token or to the combined thickness of two tokens as the case may be; and the thickness of the edge of each opening 72 is approximately equal to the thickness of the coin unit which is to pass through said opening, that is to say, is equal to the combined thickness of the coins comprising such unit. A support or platform 73 is located beneath each reservoir, such platform being mounted on a vertical post 74, which latter is adjustably secured to the member 2 by means of upper and under nuts 75—75. The platforms 73 are all practically alike except for some variation in diameter which may be present. The perforated and adjacent portions of the delivery slides are between the reservoirs and the platforms. The nuts 75 enable the posts 74 to be adjusted vertically to accommodate the platforms to the different thicknesses of the portions of the delivery slides in which the openings 71 and 72 are located. The chute 18 flares widely at the top and opens adjacent to the front sides of the rear platforms 73, and directly beneath the opening 71 in any delivery slide when the latter is in its advanced position. The chute 19 is generally similar to the chute 18, but inclines from above forwardly and downwardly to open at the bottom outside of the casing 1. The upper terminal of the chute 19 is adjacent to all of the forward platforms 73, and directly beneath any opening 72 when the slide in which such opening is located is in its foremost position. The sides of the chute 18 converge and join the extension 17 below.

The bottom of the chute 19 is normally closed by means of a horizontal slide 76. Each side of the chute 19 at the lower terminal is provided with a guide-way 77 that extends beyond said chute behind. These guide-ways are for the slide 76. The lower part of the front side of the chute 19 forms a stop for the slide 76 when moved forward, and said slide is provided at the front end with a depending lug or finger 78. Said guide is also provided at the rear end with a depending lug 79. A flat spring 80 is arranged to bear on the lug 79 and normally retain the slide 76 in its forward or closed position. The finger 78 affords a convenient means for pressing the slide 76 inwardly against the resiliency of the spring 80, with the fingers, into the position indicated by dotted lines in Fig. 14, by the hand when placed beneath the chute 19 for the purpose of receiving coins therefrom. The front of the casing 1 is cut away and indented to the extent necessary to accommodate the lugs 79 and 78. One terminal of the spring 80 is secured to the member 2, as clearly shown in Fig. 1 which is broken away for the purpose, while the free terminal of said spring bears against the back side of the lug 79.

When the delivery slides are in their normal position, with their openings 71 and 72 in line with the reservoirs, the predetermined number of tokens and coins are in said openings and resting on the platforms 73 below. There is then a single token in the opening 71 in each of the slides 61 and 60, two tokens in such opening in the slide 59, and three tokens in the slide 58; and there are then three pennies in the openings 72 in said slide 61, three nickles and three pennies in such opening in said slide 60, a dime and one penny in such opening in said slide 59, four pennies in such opening in said slide 58, and five pennies in such opening in the slide 57. There is no opening 71 in the slide 57. Upon drawing forward any delivery slide, the coins contained in the opening 72 therein are drawn forward off of the associated front platform 73 and dropped into the chute 19 onto the slide 76, from which chute they are delivered into the hand of the conductor when he pushes back said slide, and at the same time the token or tokens in the opening 71 in said slide (the slide 57 not included) are drawn off of the associated rear platform 73 and dropped into the chute 18, from which they pass through the extension 17 into the box 15.

The delivery slides are necessarily cut away behind the platforms 73 in order to enable said slides to be drawn outwardly. These cut-out portions of the slides may be utilized for locking the same in inoperative position, when the conductor desires to leave the machine alone, by providing a rock-shaft 81, and equipping the same with angular arms 82 to engage and disengage preferably the rear edges of the cut-out portions that are provided for the front platforms 73. The rock-shaft 81 is journaled at each end in a lug 83 supported beneath the member 32 and attached to the walls of the chamber 3, and has one terminal accessible beyond one of such walls and adapted to be operated by means of a key or other special implement. The arms 82 correspond in number with the delivery slides, and are capable of engaging said slides in their rearward positions, or when drawn forward behind the forward ends of the cut-away portions for the rear platforms 73, substantially as indicated by dotted lines in Fig. 14. Normally the arms 82 are down and out of the way of the delivery slides.

In connection with the action of the delivery slides it should be observed, that, when a slide is drawn forward, the imperforate portions thereof behind the openings 71 and 72 pass beneath the columns of tokens and coins in the reservoirs above and so support the same. And, upon the return of the slide to normal position, the columns of tokens and coins descend, when the openings 71 and 72 arrive beneath the same, and fill each of said openings with the following unit or units which are then in readiness for the next delivery. There are no tokens for the slide 57 as previously explained.

The delivery slide 59, in Figs. 14 and 15, is shown in delivery position, with two tokens (155) representing two fares dropping through the chute 18, and a dime and a penny, the same being the change out of a quarter after allowing fourteen cents for said two fares, dropping through the chute 19.

Figure 2:
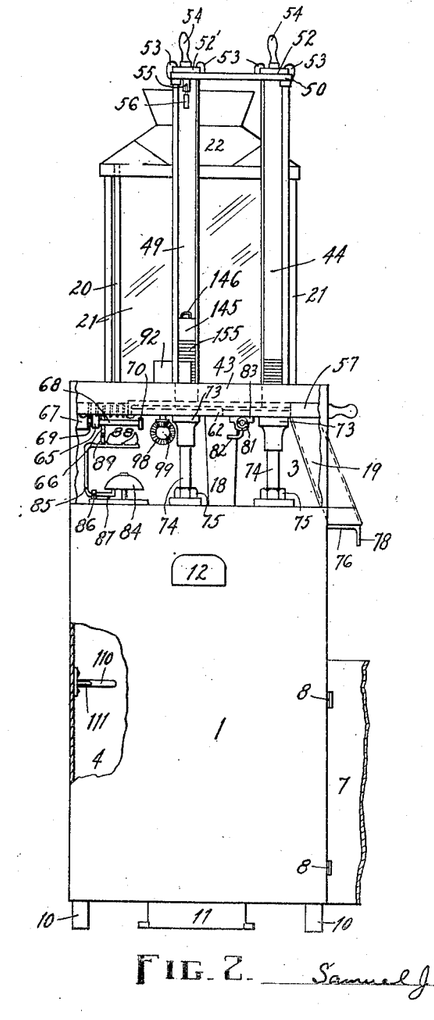
Fig. 2, a left-hand end elevation of said machine.

It is desired to indicate audibly the number of fares for which the conductor is making change at any and all times, and to this end I have provided four bells 84, one for each delivery slide except the slide 57. No bell or other similar indicator is needed for this slide because the money delivered therefrom is merely exchanged for a like amount. The bells 84 are of ordinary construction and suitably mounted on the member 2, and each is provided with a spring-pressed striker 85, which striker has the general outline of the letter C. Each striker 85 is pivotally mounted at 86 in a post which rises from the base piece for the associated bell, and a spring for such striker is represented at 87—see Fig. 14. The striker 85 rings its bell by contacting, through the medium of the lower arm of said striker, with said bell. The upper arm of the striker is provided with one or more upwardly-extending projections 88. The striker, for the bell 84 that is associated with each of the slides 61 and 60, is provided with only one projection 88, and this is located at the extreme front end of the upper arm of the striker, the upper arm of the next striker toward the left is provided with two such projections, as shown in Fig. 14, and the upper arm of the extreme left-hand striker is provided with three such projections, as shown in Fig. 2. One of the striker arms that is provided with a single projection is represented in Fig. 13. The projection or projections 88 on each striker are in the path of a dog with which each of the bars 66 is provided at its lower terminal. Each dog 89 is pivotally attached at 90 to one of the bars 66, and a spring 91 is attached to such bar and bears on said dog in such a manner as to retain the latter normally in a vertical position.

While the delivery slides are in their retracted position, the dogs 89 are behind the projections 88, but when any slide is drawn forward its now rigid dog contacts with the projection or projections in its path, and causes the striker 85, of which such projections form parts, to ring the bell 84, with which said striker is associated, the number of times that corresponds with the number of projections. Thus when either of the slides 61 or 60 is drawn forward, its associated bell 84 is rung once, because the dog 89 carried by said slide encounters only one projection 88 in its path; when the slide 59 is drawn forward, its associated bell is rung twice because the dog carried by said slide encounters the two projections in its path; and when the slide 58 is drawn forward, its associated bell is rung three times, because the dog carried by said slide encounters the three projections in its path. Each dog 89 imparts as many pulsations to the striker below as there are projections 88 on such striker. In the manner and by the means just described the passengers and any representative of the company are informed audibly of the number of fares for which change is made by the conductor, and improper manipulation by the conductor of the delivery slides, whereby the wrong slide might be operated and the change juggled in such a manner as to inure to the unfair or dishonest advantage of the conductor, is rendered dangerous.

As each dog 89 is returned to initial position by the retraction of the slide which carries said dog, the associated spring 91 yields and permits said dog to pass lightly over the projection or projections 88 in its path, without actuating the striker 85 below and causing the same to sound its bell. To this end the springs 91 are on the front sides of the bars 66 and dogs 89.

For the benefit of the company and the conductor it is desirable to provide means for registering the tokens as they are used, because without means of this character the tokens in the box 15 would have to be more frequently counted, and the conductor would be more or less at the mercy of the men in the office. For this purpose, therefore, I have provided the machine with a register or counter 92 of ordinary construction, and with operating mechanism for the same. The register 92 is mounted on the member 43 behind the reservoir 44. Upon referring to Fig. 11 it will be seen that the operating spindle 93 of the register 92 is equipped with a bevel-gear 94 which intermeshes with a bevel-gear 95 secured to a vertical shaft 96 at the upper terminal thereof, a bevel-gear 97 secured to said shaft at the lower terminal thereof, a bevel-gear 98 that intermeshes with said bevel-gear 97, a horizontal rock-shaft 99 (Figs. 11 and 14), to the left-hand terminal of which said bevel-gear 98 is secured, a series of radial lugs 100 carried by said rock-shaft, fingers 157 pivotally connected at 158 with said lugs, springs 159 attached to the back sides of said lugs, and arranged to bear on the corresponding sides of said fingers, a series of angular rods or dogs 101 carried by the delivery slides, and a spring 102. The shaft 96 is journaled in the member 43, and the rock-shaft 99 is journaled in suitable brackets which depend from certain of the members 63. These brackets are indicated by the numerals 103 and 104. The bracket 103 also affords a journal for the shaft 96 at its lower terminal. The spring 102 has one terminal wrapped about and fastened to the rock-shaft 99, at the right-hand end of said shaft, and the other terminal secured to a pin 105 that extends inwardly from the right-hand wall of the chamber 3. The arrangement of the springs 159 is such that the fingers 157 are permitted to swing rearwardly, just as the arrangement of the springs 91 permits the dogs 89 to swing forwardly. The spring 102 is arranged and adapted normally to retain the rock-shaft 99 in such a position that the fingers 157 are disposed vertically in the paths of the horizontal portions of the angular rods or dogs 101, and said spring is also adapted to return said rock-shaft to the position just described, after said shaft has been rocked out of such position.

It is to be understood that the register 92 is provided with the usual ratchet mechanism whereby it is possible to impart an oscillatory movement to the shaft 93, and at the same time cause the computing wheels to operate in the manner necessary to register in figures the number of tokens dispensed.

There is one of the dogs 101 on the bottom of each of the slides 61 and 60, inasmuch as these are one-fare slides, two of said dogs on the bottom of the slide 59 which is a two-fare slide, and three on the bottom of the slide 58 which is a three-fare slide.

Each time that either of the slides 61 or 60 is drawn forward, the dog 101 carried thereby contacts with the now rigid finger 157, which is in the path of such dog, and rocks the rock-shaft 99 against the resiliency of the spring 102, with the result that the mechanism of the register 92 is actuated one point, through the medium of the bevel-gears 98 and 97, the shaft 96, the bevel-gears 95 and 94, and the shaft 93. The spring 102 immediately returns the rock-shaft to initial position with the fingers 157 standing upright. Then, when the slide is released to its spring 64 and returns to initial position, the dog passes rearwardly behind the finger, the latter swinging on its pivot 158 and against the resiliency of its spring 159 as the dog passes over the same, and takes its place in readiness to actuate the registering or counting mechanism again upon the next forward movement of the slide. The construction of the counting mechanism in the register 92 is of a nature to permit the dog 101 to return to initial position without actively operating said mechanism.

Similar results are produced when the slide 59 is drawn forward, except that the counting mechanism is advanced two points owing to the fact that said slide is provided with two of the dogs 101. So, also, with reference to the slide 58, except that in this case there are three of the dogs 101, and the counting mechanism is, therefore, advanced three points.

Referring next more particularly to the views on the last sheet of the drawings, it will be seen that the coin box 14 has a circular opening 106 in the top thereof, and that the token box 15 has a rectangular opening 107 in the top thereof. The lower open end of the chute 16 is directly over the opening 106 in the box 14, when said box is in place, and the lower open end of the extension 17 is directly over the opening 107 in the box 15, when the latter box is in place. The opening 106 is automatically closed by means of semi-circular, sliding plates 108, and the opening 107 is automatically closed by means of a rectangular, sliding plate 109.

As an auxiliary to the operating mechanism for the plates 108 and 109 rods 110 and 111, respectively, are provided. As best shown in Fig. 2, a portion of the casing of which is broken out for the purpose, the rods 110 and 111 are secured to the rear wall of the chamber 4 and project horizontally forward in said chamber. In the rear end of the box 14 is an opening 112 for the entrance of the rod 110, and in the rear end of the box 15 is an opening 113 for the entrance of the rod 111.

There are three ribs or guides 114 on the floor of the chamber 4, which guides are parallel with the end walls of said chamber, and spaced apart to receive between them the boxes 14 and 15. These guides are clearly shown in Figs. 1, 4, 6, and 7, and there are also shown in these views latch rods 115, one for each box 14 and 15. The rods 115 are mounted in lugs 116 on top of the left-hand and intermediate guides 114, and are adapted to rotate therein. The rear end of each rod 115 is headed over, and at the front end of such rod is an angular extension 117. The rods 115 are turned in their lugs or bearings 116 so as to cause their extensions 117 to project vertically or approximately so except when the boxes 14 and 15 are in place. After the boxes are pushed into the chamber 4 on the floor thereof between the guides 114 and back as far as the rear wall of said chamber permits, the rods 115 are turned so as to locate the extensions 117 in front of adjacent portions of said boxes, thus holding them against forward movement.

As the boxes 14 and 15 are pushed into place the rods 110 and 111 enter the same and act on the mechanism therein, which will presently be described.

The box 14 has a cover 118 which is hinged thereto at 119—119 and closes into the body of the box so that the top of said cover is flush with the upper edges of said body, and said box is provided at the rear end with a lock for said cover, which lock is represented at 120. The key to this lock is retained in the office of the company. The box 15 has a cover 121 which is hinged thereto at 122. This cover also fits into the body of the box flush with the top edges thereof, and is provided at the rear end with a hasp 123 which cooperates with a staple 124 at the rear end of the body of said box, and a padlock (not shown) by means of which said cover is locked in its closed position. The key for opening the cover 121 is also held in the office of the company.

The mechanisms to which reference has just been made include spring-pressed members which are contacted with by the rods 110 and 111, so that there would be a tendency to thrust the boxes 14 and 15 forward were it not for the restraint placed thereon by the rods 115.

Both of the covers 118 and 121 are of box formation in order to afford the best means for installing the operating mechanisms for the plates 108 and 109, and the under plates which assist in converting the covers into chambers or compartments are broken away in Figs. 16, 17, 19, and 20, so as clearly to disclose the mechanisms within the covers. In the rear ends of these covers must also be provided openings to align with the openings 112 and 113, when said covers are closed, for the entrance of the rods 110 and 111.

Figure 16:
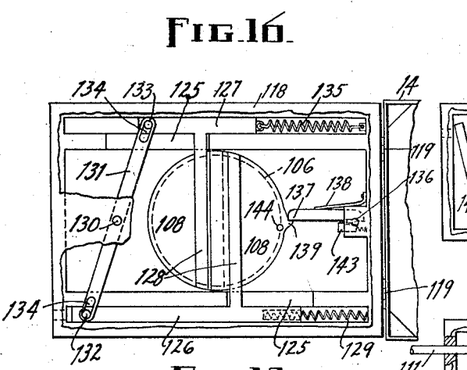
Fig. 16, an enlarged plan of the inside of the cover of the coin box, showing the opening in the same closed.
Figure 17:
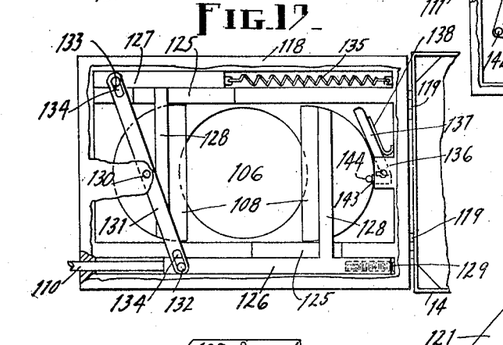
Fig. 17, a similar plan showing said opening uncovered.
Figure 18:
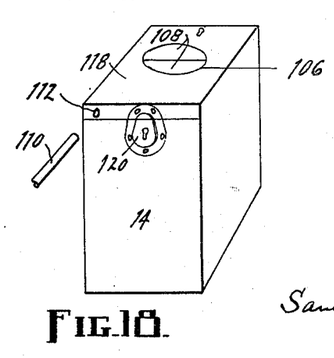
Fig. 18, an isometric view of said box.

Slidingly arranged in the cover 118, between the sides of the compartment therein and fixed guides 125—125 in said compartment and parallel with said sides, are two bars 126 and 127. Each of these bars has a cross-piece 128 to which one of the plates 108 is securely attached. The rear end of the bar 126 is adapted to be contacted with by the rod 110, and there is a spring 129 between the front end of said bar and the front end of the cover. This is a compression spring. Pivotally attached at 130 intermediate of its ends to the cover 118, a short distance from the rear end thereof, is a lever 131. One end of the lever 131 is pivotally attached at 132 to the bar 126 near the rear end thereof, and the other end of said lever is pivotally attached at 133 to the bar 127 near the rear end thereof. The pivots 132 and 133 pass through longitudinal slots 134—134 in the lever 131 to afford the necessary lost motion when said lever is actuated. When the plates 108 are closed, as best shown in Fig. 16, the lever 131 is disposed obliquely in one direction, and when said plates are open, as best shown in Fig. 17, said lever is disposed obliquely in the opposite direction. A spring 135 has one end attached to the forward end of the bar 127 and the other end attached to the front end of the cover. This is an expansion spring.

When the box 14 is pushed into place, the rod 110 enters the openings provided for the same and contacts with the adjacent end of the bar 126, forces said bar forwardly against the direct resiliency of the spring 129 and the indirect resiliency of the spring 135, and, acting through the lever 131, forces the bar 127 rearwardly, against the direct resiliency of said spring 135. These actions produced by the rod 110 cause the cross-pieces 128 to move away from each other and carry with them the plates 108, with the result that the opening 106 is uncovered, so that whatever coins and tickets are dumped into the chute 16 can pass into the box 14.

Upon the withdrawal of the box 14, the rod 110 releases the bars 126 and 127 to their springs, with the result that the plates 108 come together in the central diameter of the opening 106 transversely of the cover 118, and so tightly close said opening.

In order to prevent the plates 108 from being pried apart, when the box 14 is out of the chamber 4, suitable locking means is provided, such as that illustrated in Figs. 16 and 17. Such means comprises a lock 136, an oscillatory bolt 137 which forms a part of said lock and is adapted to be actuated in one direction by means of the lock mechanism and in the other direction by means of a spring 138, a releasing plunger 143, and a pin 144. The plunger 143 is a part of the lock 136, and is in the path of the pin 144, which latter projects downwardly from the plate 108 which is adjacent to said lock. Said plate is also provided with a lug 139 with which the free end of the bolt 137 engages when said bolt is in locking position.

When the plates 108 are in their closed position, as shown in Fig. 16, the bolt 137, under the influence of its spring 138, is in engagement with the lug 139, and in approximate alignment with the longitudinal center of the cover 118, so that the plate 108 engaged by said bolt can not be thrust towards the lock 136, and neither can the other plate 108 be forced away from the first because of the presence of the intervening mechanism. Upon operating the lock 136, with the key thereof which is retained in the office, the bolt 137 is actuated, against the resiliency of the spring 138, out of engagement with the lug 139 and out of restraining position relative to the adjacent plate 108. As soon, however, as the box 14 is inserted again in the chamber 4, and the plates 108 are opened through the medium of the rod 110 and the intervening mechanism, the pin 144 encounters the plunger 143 and forces the same inwardly to release the bolt 137. The bolt 137 now bears against the curved edge of the contiguous plate 108 in readiness to ride down on such edge and assume its locking position as soon as said plate with its companion is again closed as the result of the withdrawal of the box 14 from the chamber 4, and the consequent withdrawal of the rod 110 from the cover 118 and said box—see Fig. 17. The plunger 143 is necessarily an outwardly spring-pressed member.

Figure 19:
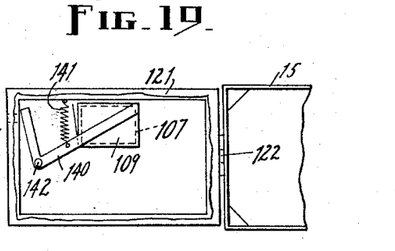
Fig. 19, an enlarged plan of the inside of the cover of the token box, showing the opening in the same closed.

The operating mechanism for the plate, 109, in the cover 121 of the box 15, consists merely of a bell-crank-lever 140 and a spring 141. The bell-crank-lever 140 is pivoted at 142 to the cover, and consists of a long arm to which the plate 109 is securely attached, and a short arm which extends into the path of the rod 111. The spring 141 has one end attached to one side edge of the cover and the other end attached to the long arm of the bell-crank-lever, and has a constant tendency to actuate said lever in such a manner as to carry the plate 109 over, or in reality under, the opening 107, and to retain it in such position, as best shown in Fig. 19.

Figure 20:
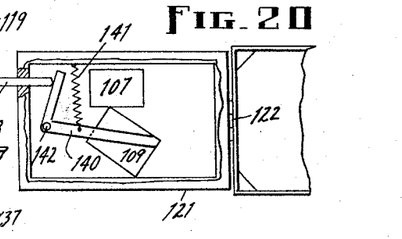
Fig. 20, a similar view showing said opening uncovered, and, Fig. 21, an isometric view of said last-named box.
Figure 21:
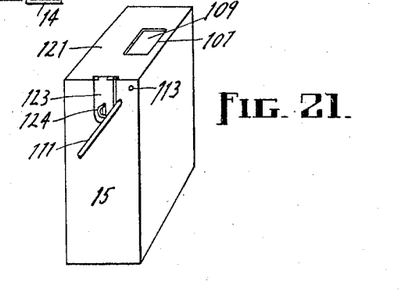

When the box 15 is pushed into the chamber 4, the rod 111 enters the openings provided for the same in the box and its cover and encounters the short arm of the bell-crank-lever 140, and actuates said lever, against the resiliency of the spring 141, in such a manner that the plate 109 is carried away from the opening 107 into the position shown in Fig. 20. Upon the withdrawal of the box 15, the bell-crank-lever 140 is released by the rod 111 to the spring 141, and said spring immediately acts to rock said lever on the pivot 142 in the direction to carry the plate 109 beneath the opening 127 and close the same.

A weight or slug 145 (Figs. 2 and 13), having on the top thereof a staple 146, is placed in each reservoir 49 above the tokens therein, and descends as said tokens are removed by the delivery slides. After the last token has been removed from any reservoir 49, and the delivery slide by means of which such removal was effected has returned to initial position, the slug 145 in said reservoir descends into the opening 71 in said slide and locks the same so that it cannot again be drawn forward until said slug is removed. This prevents a delivery slide from being operated for making change from the coin reservoir above. Otherwise it would be feasible to continue making change without any record of the same being provided in the form of tokens, representing the fares for which change is made, deposited in the box 15.

A hook 147, such as that shown in Fig. 5, is provided for removing the slugs from the reservoirs 49. This hook is retained in the office, and in order to use the same it is necessary to unlock and open the sliding cover 52. The slugs must be removed whenever they have descended into locking position, and whenever it is desired to refill the reservoirs 49.

Figure 10:
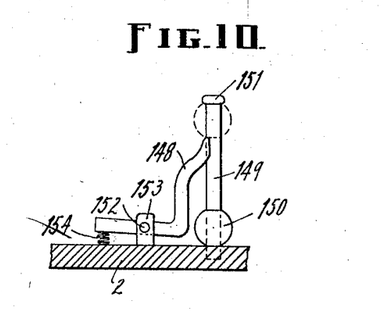
Fig. 10, an enlarged rear elevation of the tell-tale.

A tell-tale, such as that best shown in Fig. 10, is provided in order to prevent the machine from being inverted and the contents of the fare-box shaken out through the top, before such contents is dumped into the chute 16. Said tell-tale is located behind the chute 26 on the member 2, and comprises an angular, pivotally-mounted lever 148, a pin or post 149, and a ball 150. The pin 149 has its base set in the member 2, and the ball 150 is adapted to slide up and down on said pin. The pin or post 149 has a head 151 at the top. The horizontal arm of the lever 148 is pivoted at 152 to a lug 153 which rises from the member 2, and the upstanding arm of said lever is adapted at its free end to bear against the post 149, and is normally retained in engagement with said post by means of a spring 154 interposed between the member 2 and said horizontal arm adjacent to the free end thereof. Normally the ball 150 rests on the member 2, but if the machine be inverted said ball slides past the adjacent terminal of the lever 148 into contact with the head of the post 149, assuming the position indicated by dotted lines, and is there retained by means of said lever. The ball is of sufficient weight to overcome the resistance of the spring 154, when said ball slides down on the inverted post 149, and the terminal of the lever 148 which engages said post is so located that it reengages said post above said ball, as soon as the latter passes the lever, the latter being actuated immediately into engagement again with the post by said spring. Thus the ball is retained at the upper end of the post 149 after the machine with said post is righted again, and wherefore said ball furnishes positive evidence of the fact that the machine has been turned bottom side up. The ball can not be released from the latch 148 and permitted to assume its low position again without obtaining access to the fare-box, either through a suitably located door, or by taking the fare-box apart. The manner in which the ball is released and permitted to reassume the normal position is clearly apparent.

The operation of the machine as a whole will be generally understood from the foregoing description, so that it is necessary merely to recapitulate briefly.

All fares deposited in the fare-box find their way into the lock box 14, being deposited therein whenever the conductor opens the flapper 28, and when said flapper is opened simultaneously with the opening of the door 7. At stated intervals the box 14 is taken into the office, where it is unlocked and the contents dumped out. After this the box is relocked and handed back to the conductor to be replaced in the chamber 4.

The reservoirs 49 must necessarily be loaded with tokens, which latter are indicated by the numeral 155, before the first trip is made, and said reservoirs must be reloaded from time to time as required. Likewise the coin reservoirs must be partly or wholly loaded with the proper coins at the start, and these must be replenished from time to time as they become depleted.

Whatever the passenger deposits in the fare-box passes into the lock box 14 and is not handled at all by the conductor. But when change has to be made it is necessary to hand the money to the conductor and for him to manipulate the proper delivery slide to obtain the required amount that is to be returned to the passenger. At the same time the conductor obtains the change a token or tokens, according to the number of fares for which change is made, are deposited in the lock box 15, except when the slide 57 is operated for the purpose of obtaining five pennies in exchange for a nickel to enable the passenger to deposit his own fare in the fare-box. At certain intervals the lock box 15 is also taken into the office, opened, and the tokens therein dumped out and counted, after which said box is relocked and returned to place in the chamber 4. The register 92 prevents the tokens from being stolen after they have been removed from the box 15, and checks up the same so that the number reported in the office must correspond with the number on the register. The register also enables the conductor to make his report without opening the box 15.

With this machine a very much smaller number of coins are handled than is the case with ordinary fare registers, the amount being reduced in some cases two-thirds. This is due to the fact that fares for which change is made are not deposited in the fare-box, but are represented by tokens for which the conductor compensates the company out of his own pocket, he having retained the larger coins that have been handed him and for which he has made change. Even though a portion of the coins in the coin reservoirs belongs to the company when the car starts out in the morning with this machine, by far the larger portion of coins used in said reservoirs the remainder of the day is provided by the conductor.

It is necessary to provide a longitudinal slot 156 in the delivery slide 57, as shown in Fig. 11, to accommodate the vertical shaft 96.

In Fig. 2 the front wall of the chamber 3 is broken away to disclose the parts and members in said chamber.

What I claim as my invention, and desire to secure by Letters Patent, is—

1. A change-making machine comprising a container for coins of different denominations, and a container for objects, other than coins of the same shape and thickness, and means simultaneously to discharge progressively said coins and said objects.

2. In a change-making machine, a container for coins, a container for objects, other than coins, of the same shape and size, and means for simultaneously dispensing a plurality of said coins and transferring one or more of said objects.

3. A change-making machine comprising a container for coins of different denominations, a container for objects, other than coins, of the same size and shape, and means for dispensing and transferring, respectively, the coins of different denominations and said objects progressively and simultaneously.

4. In a change-making machine, coin and token reservoirs, adjustable supports beneath said reservoirs, and a delivery slide operating between said reservoirs and said supports, said slide being adapted to deliver simultaneously portions of the contents of both of said reservoirs.

5. The combination, in a change-making machine, with a casing, coin and token reservoirs mounted on said casing, and supports in said casing beneath said reservoirs, of a delivery slide operating between said reservoirs and said supports, perforated to receive coins and tokens from said reservoirs, and having a handle accessible from outside of said casing.

6. The combination, in a change-making machine, with a casing, coin and token reservoirs mounted on said casing, supports beneath said reservoirs, a chute in front of said support which is beneath the token reservoir, and a box in said casing into which said chute opens, of a delivery slide between said reservoirs and said supports, said slide being perforated to receive coins and tokens, and adapted to discharge said coins and tokens and deliver the latter into said chute.

7. The combination, in a change-making machine, with a casing, coin and token reservoirs mounted on said casing, supports in said casing beneath said reservoirs, and a coin chute in front of said support which is beneath said coin reservoir, of a delivery slide between said reservoirs and said supports, said slide being perforated to receive coins and tokens and adapted to discharge the same, the coins being discharged into said chute.

8. The combination, in a change-making machine, with a casing, coin and token reservoirs mounted on said casing, supports in said casing beneath said reservoirs, and chutes in said casing in front of said supports, the forward chute opening at the bottom outside of said casing, and a box in said casing beneath said rear chute, of a delivery slide between said reservoirs and said supports, said delivery slide being perforated to receive coins and tokens from said reservoirs and deliver them to said chutes.

9. The combination, in a change-making machine, with a casing, a plurality of coin reservoirs and a plurality of token reservoirs mounted on said casing, supports beneath said token reservoirs, a chute adjacent to said supports, and a box into which said chute opens, of delivery slides between said reservoirs and said supports, each of said slides having openings therein to receive coins and tokens and to discharge the same when such slide is drawn forward, the tokens passing through said chute into said box.

10. The combination, in a change-making machine, with a casing, a plurality of coin reservoirs and a plurality of token reservoirs mounted on said casing, supports beneath said reservoirs, and a chute in front of all of the supports that are associated with the coin reservoirs, said chute being narrow at the bottom and opening outside of the casing, of a plurality of delivery slides between said reservoirs and said supports, each of said delivery slides having openings therein to receive coins and tokens from the reservoirs above, and adapted to deliver the same when said delivery slide is drawn forward, the coins passing into said chute, to be received into the hand of the operator.

11. The combination, in a change-making machine, with a casing, reservoirs mounted on said casing, supports beneath said reservoirs, and spring-pressed perforated delivery slides between said reservoirs and said supports, of a rock-shaft provided with lugs adapted to be actuated into position to engage said slides when in their advanced position, and with their perforations out of alignment with said reservoirs, and lock the same in such position.

12. In a change-making machine, a plurality of hand-operated delivery slides, a plurality of bells, strikers for said bells, said strikers being provided with one or more projections according to the number of blows which are to be made by the striker on its bell, and means carried by said slides to engage said projections.

13. In a change-making machine, a plurality of delivery slides, a plurality of bells, strikers for said bells, said strikers having one or more projections according to the number of blows which each is to deliver to its bell, members depending from said slides, and spring-pressed dogs pivotally connected with said member and adapted to engage said projections and operate said striker when said slides are actuated forwardly, and to pass inactively over said projections when said slides are retracted.

14. In a change-making machine, a plurality of delivery slides for objects, a counter, a rock-shaft, said rock-shaft being spring actuated in one direction, driving mechanism between said rock-shaft and said counter, and means carried by said slides to actuate said rock-shaft and operate said counter.

15. In a change-making machine, a plurality of delivery slides for objects, said slides being provided with dogs, a counter, a rock-shaft spring-pressed in one direction, said rock-shaft being provided with members in the paths of said dogs, and operating mechanism between said rock-shaft and said counter.

16. In a change-making machine, a plurality of delivery slides for objects, said slides being provided with dogs, a counter, a rock-shaft spring-actuated in one direction, spring-pressed fingers pivotally connected with said rock-shaft and extending into the path of said dogs, and operating mechanism between said rock-shaft and said counter, the construction and arrangement of parts being such that said rock-shaft is actuated against the resiliency of its spring when said slides are drawn forward, but is not affected when said slides are retracted.

SAMUEL J. BELL.